Nov. 29, 1966 E. BAHNIUK 3,287,971

FLOWMETER

Filed June 10, 1964

INVENTOR.
EUGENE BAHNIUK
BY
RICHEY, McNENNY & FARRINGTON

ATTORNEYS

United States Patent Office 3,287,971
Patented Nov. 29, 1966

3,287,971
FLOWMETER
Eugene Bahniuk, Seven Hills, Ohio, assignor to The Weatherhead Company, Cleveland, Ohio, a corporation of Ohio
Filed June 10, 1964, Ser. No. 374,096
8 Claims. (Cl. 73—210)

This invention relates generally to apparatus for measuring rate of fluid flow and more particularly to flowmeters of the variable area type which detect the rate of fluid flow by measuring the effective area of a variable area orifice.

It is a principal object of this invention to provide a novel variable area orifice flowmeter which is operable over a wide flow range from extremely small rates of flow up to substantially full capacity of the conduit to which the flowmeter is connected.

It is a further object of this invention to provide a novel flowmeter as in the preceding object which has a high degree of linearity of response even at low rates of flow.

It is a further object of this invention to provide a novel flowmeter as set forth in the preceding objects which has a very fast response in changes in the rate of flow.

It is a further object of this invention to provide a novel flowmeter as set forth in the preceding objects which is relatively insensitive to changes in the viscosity of the fluid passing through the flowmeter.

It is a further object of this invention to provide a novel flowmeter as set forth in the preceding objects which measures fluid flow in one direction and provides substantially no restriction against reversal of flow through the meter.

It is a further object of this invention to provide a novel flowmeter as set forth in the preceding objects which is particularly adapted to be remotely displayed and easily adapted to recording instruments to provide a continuous flow record.

It is still another object of this invention to provide a novel flowmeter as set forth in the preceding objects which is simple and reliable in construction and lends itself to low cost manufacture.

Briefly, the foregoing is accomplished by a flowmeter, designed to be inserted into a conduit, which has a valve seat and a valve member or poppet which is biased toward the closed position by means of a cantilever spring. This spring is designed to have a relatively low rate but is given a high pre-load so that the force to move the poppet is substantially constant at all positions of the poppet so as to insure a substantially constant pressure drop across the poppet regardless of its position with respect to the valve seat. Thus, in accordance with Bernoulli's principle the rate of flow will be proportional to the area of the poppet and the area of the poppet in turn will be proportional to the amount of deflection of the cantilever spring. Suitable recording means such as a strain gage can then be applied to the cantilever spring to provide a sensing pick-up for the position of the cantilever spring which may then be converted into the rate of flow through the flowmeter.

Further features and advantages of this invention will readily become apparent to those skilled in the art from a full understanding of the preferred embodiment of the invention which is described in the following detailed description taken in connection with the accompanying drawings in which.

Figure 2:
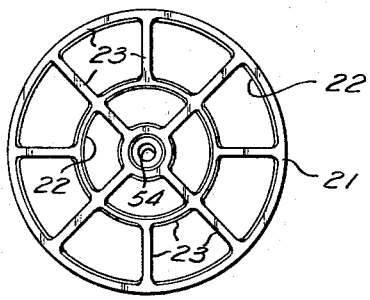
FIGURE 2 is an elevational view of a vane plate of the flowmeter of FIGURE 1.
Figure 3:
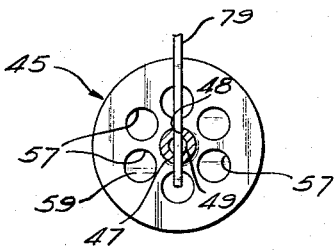
FIGURE 3 is a cross-sectional view taken on line 3—3 of FIGURE 1.
Figure 1:
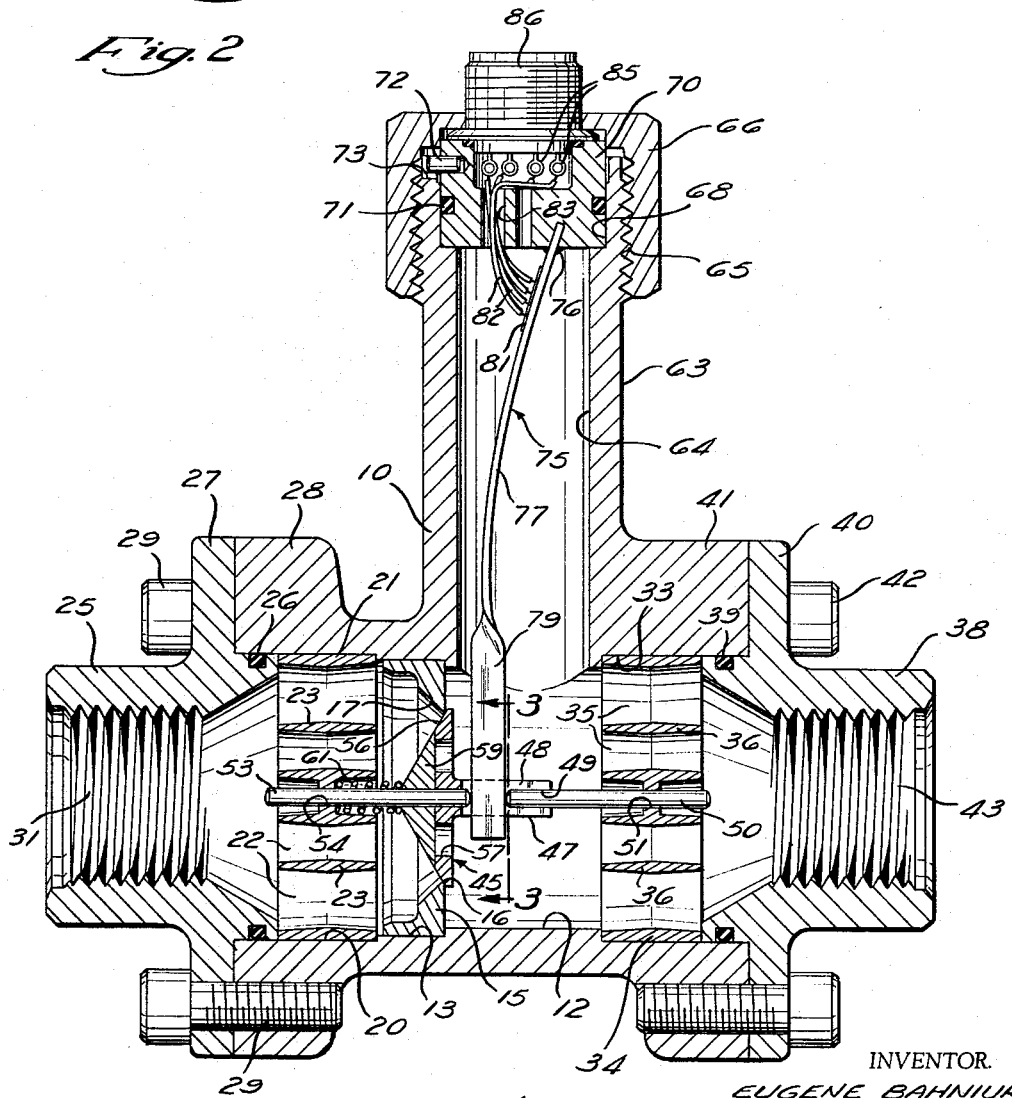
FIGURE 1 is an elevational cross-sectional view of a flowmeter according to the preferred embodiment of this invention.

Referring now to the figures in greater detail, the flowmeter has a main body member 10 which is generally T-shaped and has a central axial passage bore 12 therein. At one end of the central passage 12, the inlet end, there is a counterbore 13 within which is fitted a valve seat member 15. The valve seat member 15 defines a valve seat by the sharp edge 16 of the conical surface 17 which flares outwardly away from the central passage 12.

Axially outwardly of the valve seat 15 is another enlarged counterbore 20 within which is mounted an inlet vane plate 21 which is provided with vane portions 23 defining passages 22 as best shown in FIGURE 2. This vane plate 21 serves to stabilize the flow of fluid toward the valve seat and breaks up undesirable turbulence in the incoming fluid. Outwardly of the vane plate 21 an end cap 25 is fitted on the body 10 and has a portion projecting within the counterbore 20 with which it makes sealing contact by means of the O-ring seal 26. The end cap 25 is provided with a radial flange 27 which abuts against a mating flange 28 on the body 10 and the end cap is held in place by means of suitable cap screws indicated at 29. The end cap 25 serves to retain the vane plate 21 in position within the body and has a threaded inlet 31 to which connection can be made to an inlet pipe by means of suitable pipe fittings.

At the other end of central passage 12 is another enlarged counterbore 33 to receive an outlet vane plate 34 which has vane portions 36 defining passages 35 to stabilize the fluid flow to the central passage 12. The outlet vane plate 34 performs a similar function to the inlet vane plate 21 and is substantially identical in construction.

Outwardly of the outlet vane plate 34 is fitted an end cap 38 having a portion projecting within the counterbore 33 with which it makes a seal by means of the O-ring seal 39. End cap 38 has a radial flange 40 thereon mating with a flange portion 41 on the body 10 to which it is secured by means of cap screws 42. End cap 38 is likewise provided with a threaded outlet 43 adapted to receive a suitable pipe fitting for connection with the remainder of the fluid system.

A valve member or poppet 45 is mounted within the central passage 12 to make engagement with the valve seat 15. The valve member 45 has an axially extending shank 47 having a vertical slot 48 therein and is provided with an axially extending bore 49. To mount the valve member 45 for axial sliding movement to and from the valve seat, a first rod 50 is fitted within the shank 47 and at its other end extends to make sliding bearing engagement with a guide portion 51 in the outlet vane plate 34. Likewise, a second rod 53 is mounted in the other end of bore 49 and extends axially to make sliding bearing engagement in a guide portion 54 of the inlet vane plate 21. It will be understood that both of the rods 50 and 53 are rigidly secured to the valve member 45 for movement therewith.

The valve member 45 has a conical portion 56 on its inlet end adapted to make sealing engagement against the sharp edge 16 of valve seat 15. Radially inwardly of the conical portion 56, the valve member 45 is provided with a plurality of openings 57 extending therethrough, and these openings are normally covered by a conical check valve member 59 which is slidably mounted on the rod 53 and biased into engagement with the inlet side of the valve member 45 by means of a suitable spring 61. The check valve member 59 is provided to act as a check valve so that when flow occurs in the forward or measuring direction in the flowmeter, the check valve will seal the openings 57 and require that the inlet fluid move the valve member 45 away from the valve seat. However, in the case that reverse flow is encountered the pressure will cause the check valve 59 to shift away from the valve member 45 against the bias of spring 61 so as to allow free reverse flow of fluid through the openings 57.

The body 10 has a radially extending stem 63 on its mid-portion, and stem 63 in turn has a bore 64 extending radially outward from the central passage 12. At its outer end, the stem 63 has a threaded portion 65 adapted to receive a cap 66. The outer end of bore 64 has an enlarged counterbore portion 68 which is adapted to receive a plug 70 which makes sealing engagement by means of an O-ring seal 71 against the wall of the counterbore 68. A radial dowel pin 72 is carried by the plug 70 to register with a radial opening 73 in the wall of stem 63 to position the plug 70 in place in proper alignment.

A cantilever spring 75 is securely mounted on the inner end of plug 70 and rigidly held in place by suitable means such as brazing or solder as indicated at 76. The spring 75 has a resilient shank portion 77 extending down the bore 64 toward the central passage 12. At the end of the shank portion 77 is a blade portion 79 which fits within the slot 48 on shank 47 of the valve member. It will be understood that the blade end 79 is positioned in the shank 47 by means of the two rods 50 and 53 which are so located within the shank 47 as to allow no axial play between movement of the blade end 79 and the valve member 45. Thus, the cantilever spring 75 serves to bias the valve member 45 to a closed position and the spring characteristics may be determined by the particular width and thickness of the shank portion 77 which provides the necessary spring action between the plug 70 and the blade end 79. Preferably, the spring 75 is constructed and arranged when positioned within the flowmeter assembly to have a relatively low spring rate but is flexed sufficiently to give a high pre-load holding the valve member 45 in a closed position, so that after the pressure in the inlet side is sufficient to cause the valve member to move away, the low rate of this spring insures that little additional force is needed to move the valve member 45 to different open positions.

To measure the amount of flexing of the spring 75 and thus by this deflection to allow measurement of the position of the valve member 45, a strain gage 81 is mounted on the shank portion 77. The strain gage 81 may be of the bonded wire type and the connecting wires 82 run through a suitable passage 83 in plug 70 to make electrical connections with the terminals 85 on an electrical connector 86 mounted between the outer end of plug 70 and the cap 66.

The operation of the flowmeter is based on the fact that as described above while a relatively high force is required to move the valve member 45 away from its sealing contact with its valve seat 15, only little additional force is needed to move it to a wide open position. In accordance with Bernoulli's principle that fluid flow through an orifice is proportional to the area of the orifice and to the square root of the pressure drop across the orifice, it will be seen that the pressure drop changes very little because of the low rate of the cantilever spring. Thus, the effective area of the orifice will be proportional to the rate of flow through the flowmeter and since the area will be directly proportional to the distance of movement of the valve member 45 away from the valve seat, measurement of this movement can be arranged to give a direct reading as to the size of the orifice area and thus the amount of flow through the flowmeter. This latter is read by the strain gage 81 which may be connected to suitable external recording and indicating instruments as is desired for the particular application of the flowmeter.

Because the valve member 45 may be made very light, the simple construction gives very fast response to changes and rate of flow because of the low inertia of the valve member. Also, due to the construction of the conical surface of the valve member and the sharp edge of the valve seat, the flow characteristics will be very excellent even at only very small openings and therefore the flowmeter will give excellent linear response at high accuracy even with extremely low rates of flow. Furthermore, the design of the valve seat 15 and the conical shape provided by the shape of the check valve 59 and the conical portion 56 of valve member 45, the effects of changes in the viscosity of the fluid flowing through the flowmeter will be relatively small and therefore the readings of the flowmeter will be relatively independent of and insensitive to changes in viscosity of the fluid passing through the flowmeter.

Although the preferred embodiment of the invention has been described in considerable detail, it is recognized that upon a complete understanding of the invention various modifications and rearrangements will become obvious to those skilled in the art and may be resorted to without departing from the scope of the invention as defined in the claims.

What is claimed is:

1. A flowmeter for measuring the rate of fluid flow comprising a body having an inlet and an outlet, a passage extending between said inlet and said outlet, a valve seat in said passage, a valve member adapted to move to and from said seat to provide a variable area orifice between said seat and said valve member, a cantilever spring mounted in said body having a high preload to bias said valve member toward said seat and having a spring rate to maintain the biasing force substantially constant over the range of movement of said valve member, and sensing means responsive to deflection of said cantilever spring adapted to indicate the position of said valve member and hence the area of said orifice and thereby indicate the rate of fluid flow through the passage.

2. A flowmeter for measuring the rate of fluid flow comprising a body having an inlet and an outlet, a passage extending between said inlet and said outlet, a valve seat in said passage, a valve member adapted to move to and from said seat to provide a variable area orifice between said seat and said valve member, a cantilever spring mounted on said body having a high preload to bias said valve member toward said seat and having a spring rate to maintain the biasing force substantially constant over the range of movement of said valve member, a strain gage on said cantilever spring arranged to measure deflection of said spring and hence movement of said valve member to indicate the position of said valve member and the area of said orifice and thereby indicate the rate of fluid flow through the passage.

3. A flowmeter for measuring the rate of fluid flow comprising a body having an inlet and an outlet, a passage extending axially in said body between said inlet and said outlet, a valve seat in said passage, a valve member adapted to move axially along said passage to and from said valve seat to provide a variable area orifice between said seat and said valve member, a cantilever spring mounted in said body having a high preload to bias said valve member toward said valve seat and having a spring rate to maintain the biasing force substantially constant over the range of movement of said valve member, and sensing means responsive to deflection of said cantilever spring to indicate the position of said valve member and hence the area of said orifice and thereby indicate the rate of fluid flow through the passage.

4. A flowmeter for measuring the rate of fluid flow comprising a body having an inlet and an outlet, a passage extending axially in said body between said inlet and said outlet, a valve seat in said passage, a valve member adapted to move axially along said passage to and from said valve seat to provide a variable area orifice between said seat and said valve member, a cantilever spring member mounted in said body having a high preload to bias said valve member toward said valve seat and having a spring rate to maintain the biasing force substantially constant over the range of movement of said valve member, a strain gage bonded to said cantilever spring and arranged to measure deflection of said spring and the position of said valve member to indicate the area of said orifice and hence the rate of fluid flow through the passage.

5. A flowmeter for measuring the rate of fluid flow comprising a body having an inlet and an outlet, an axial passage extending between said inlet and said outlet, a valve seat member in said passage, said valve seat member defining a valve seat having a diameter less than the diameter of said passage, a valve member in said passage mounted for axial movement to and from said valve seat, said valve member having a portion adapted to make sealing contact with said valve seat whereby axial movement of said valve member to and from said valve seat provides a variable area orifice between said seat and said valve member, a cantilever spring member mounted in said body having one end engageable with said valve member to bias said valve member toward said valve seat, said cantilever spring being arranged to have a low spring rate and being deflected sufficiently to apply a high pre-load when said valve member is in engagement with said valve seat whereby the position of said valve member with respect to said valve seat is substantially independent of the force applied to said valve member, and strain gage means bonded to said cantilever spring to be responsive to deflection of said cantilever spring to indicate the movement of said valve member with respect to said valve seat and hence the area of said orifice to thereby indicate the rate of fluid flow through the passage.

6. A flowmeter for measuring the rate of fluid flow comprising a body having an inlet and an outlet, an axial passage extending between said inlet and said outlet, a valve seat member in said passage, said valve seat member defining a line contact valve seat having a diameter less than the diameter of said passage, a valve member in said passage mounted for axial movement to and from said valve seat, said valve member having a conical portion adapted to make sealing contact with said valve seat whereby axial movement of said valve member to and from said valve seat provides a variable area orifice between said seat and said conical surface, a cantilever spring member mounted in said body having one end engageable with said valve member to bias said valve member toward said valve seat, said cantilever spring being arranged to have a low spring rate and being deflected sufficiently to apply a high pre-load when said valve member is in engagement with said valve seat whereby the position of said valve member with respect to said valve seat is substantially independent of the force applied to said valve member, and strain gage means bonded to said cantilever spring to be responsive to deflection of said cantilever spring to indicate the movement of said valve member with respect to said valve seat and hence the area of said orifice to thereby indicate the rate of fluid flow through the passage.

7. A flowmeter for measuring the rate of fluid flow comprising a body having an inlet and an outlet, an axial passage extending between said inlet and said outlet, a valve seat member in said passage, said valve seat member defining a line contact valve seat having a diameter less than the diameter of said passage, a valve member in said passage mounted for axial movement to and from said valve seat, said valve member having a conical portion adapted to make sealing contact with said valve seat whereby axial movement of said valve member to and from said valve seat provides a variable area orifice between said seat and said conical surface, a cantilever spring member mounted in said body having one end engageable with said valve member to bias said valve member toward said valve seat, said cantilever spring being arranged to have a low spring rate and being deflected sufficiently to apply a high pre-load when said valve seat whereby the position of said valve seat member with respect to said valve seat is substantially independent of the force applied said valve member, and sensing means adapted to measure the movement of said valve member with respect to said valve seat and hence the area of said orifice to thereby indicate the rate of fluid flow through the passage.

8. A flowmeter for measuring the rate of fluid flow comprising an elongated body having an inlet and an outlet, a central axial passage extending between said inlet and said outlet, a first flow directing vane plate spaced between said inlet and said central passage, a second flow directing vane plate between said central passage and said outlet, each of said vane plates comprising a unitary member having a plurality of axial passages therethrough separated by vanes forming wall portions of said passages, a valve seat member in said central passage adjacent said inlet vane plate, said valve seat member having a conical portion flaring outwardly from said central passage to define a line contact valve seat having a diameter less than the diameter of said passage, a valve member in said central passage, said valve member having a conical head portion adapted to make contact with said valve seat, said valve member having an axially extending shank in said central passage, a first rod secured in said shank and slidably engaged in said outlet vane plate, a second axially extending rod secured to said valve member and slidably engaged in said inlet vane plate whereby said valve member and said rods slide as a unit in said vane plates to and from said valve member, said shank having a radially extending slot limited at axial ends by said rods, said valve member having a plurality of axially extending openings radially outward from said shank and radially inward from said conical portion, a conical check valve member slidably mounted on said second rod and adapted to close off said openings, said check valve member having a conical surface coextensive with the conical portion of said valve member when said check valve is in the closed position, spring means biasing said check valve member to the closed position, said flowmeter body having a hollow stem portion extending radially outward from said central axial passage, a plug mounted in the outer end of said stem, a cantilever spring fixedly secured in said plug and extending along said stem, said cantilever spring having a flexible shank portion within said stem, said cantilever spring having rigid blade portion engaging said slot in said valve member stem whereby said cantilever spring operates to bias said valve member into engagement with said valve seat, said cantilever spring being constructed and arranged to have a relatively low rate and a substantially high pre-load when said valve member is in engagement with the valve seat, a resistance type strain gage bonded to said shank portion of said cantilever spring whereby deflection of cantilever spring varies the resistance of said strain gage, electrical connector means on said body stem adapted to receive leads from said strain gage, whereby said strain gage is adapted to measure the position of said valve member with respect to said valve seat and thus the effective area of the orifice formed between said valve member and said valve seat and the rate of flow through said flowmeter.

References Cited by the Examiner

UNITED STATES PATENTS

| | | | |
|---|---|---|---|
| 1,027,250 | 5/1912 | Hartung | 73—210 |
| 1,513,016 | 10/1924 | St. John. | |
| 1,676,674 | 7/1928 | St. John. | |
| 3,147,620 | 9/1964 | Stapler | 73—228 |

FOREIGN PATENTS

| | | |
|---|---|---|
| 578,922 | 7/1924 | France. |
| 342,488 | 10/1919 | Germany. |

RICHARD C. QUEISSER, *Primary Examiner.*

E. D. GILHOOLY, *Assistant Examiner.*